United States Patent [19]
Lyon

[11] Patent Number: 5,739,820
[45] Date of Patent: Apr. 14, 1998

[54] METHOD AND APPARATUS FOR SPECULAR REFLECTION SHADING OF COMPUTER GRAPHIC IMAGES

[75] Inventor: Richard F. Lyon, Los Altos, Calif.

[73] Assignee: Apple Computer Inc., Cupertino, Calif.

[21] Appl. No.: 984,180

[22] Filed: Nov. 19, 1992

[51] Int. Cl.$^6$ .................................................. G06T 15/50
[52] U.S. Cl. ........................................... 345/426; 345/427
[58] Field of Search .................................. 395/126, 127; 364/729

[56] References Cited

U.S. PATENT DOCUMENTS

| | | | |
|---|---|---|---|
| 3,728,528 | 4/1973 | Walters | 364/720 |
| 3,789,203 | 1/1974 | Catherall et al. | 364/723 |
| 4,855,935 | 8/1989 | Lien et al. | 395/142 |
| 4,899,302 | 2/1990 | Nakayama | 364/729 |
| 4,901,064 | 2/1990 | Deering | 395/126 |
| 4,905,158 | 2/1990 | Seki et al. | 364/474.29 |
| 4,943,938 | 7/1990 | Aoshima et al. | 395/126 X |
| 4,956,799 | 9/1990 | Nakayama | 364/729 |
| 5,046,108 | 9/1991 | Inoue et al. | 395/126 X |
| 5,063,375 | 11/1991 | Lien et al. | 395/126 X |
| 5,109,481 | 4/1992 | Lathrop et al. | 395/133 |
| 5,119,444 | 6/1992 | Nishihara | 382/263 |
| 5,125,073 | 6/1992 | Lien et al. | 395/142 |
| 5,163,126 | 11/1992 | Einkauf et al. | 395/126 X |
| 5,179,659 | 1/1993 | Lien et al. | 395/513 |
| 5,222,202 | 6/1993 | Koyamada | 395/123 |
| 5,253,339 | 10/1993 | Wells et al. | 395/126 |
| 5,369,737 | 11/1994 | Gholizadeh et al. | 395/126 |
| 5,500,907 | 3/1996 | Kunitake et al. | 382/240 |

FOREIGN PATENT DOCUMENTS 0456408  5/1991  European Pat. Off. ......... G06F 15/72

OTHER PUBLICATIONS

Brinkmann et al., Linear Algebra And Analytic Geometry, 1971, pp. 345–351.

Foley et al., Computer Graphics: Principles and Practice, 1990, pp. 721–741, 1094–1099.

Schildt, Using Turbo C++, 1990, p. 392.

Beyer, Standard Mathematical Tables, 1978, pp. 169, 388.

Bui Tuong-Phong, "Illumination for computer-generated images," University of Utah, Jul. 1973, pp. 29–51.

Bui Tuong Phong, "Illumination for Computer Generated Pictures," Jun. 1975, vol. 18, No. 6, pp. 311–317.

James F. Blinn, "Models of Light Reflection For Computer Synthesized Pictures," ACM Siggraph 1977 Proceedings, pp. 192–198.

Gary Bishop; David M. Weimer, "Fast Phong Shading," ACM Siggraph 1986 Proceedings, vol. 20, No. 4, pp. 103–106.

A.A.M. Kujik; E.H. Blake, "Faster Phong Shading via Angular Interpolation," Computer Graphics Forum, 1989, vol. 8, pp. 315–324.

Ute Claussen, "On Reducing the Phong Shading Method," Eurographics 1989, pp. 333–344.

*Primary Examiner*—Anton W. Fetting
*Attorney, Agent, or Firm*—Carr, DeFilippo & Ferrell

[57] ABSTRACT

A method and system for approximating a Phong shading calculation for 3D renderings of realistic graphic images. The new method uses only a modest number of multiplies and adds to approximate a calculation that required divides, square roots and powers. The approximation uses approximate normalization, vector differences, and a shape function to simplify the processing and to improve performance significantly while still generating a graphic rendering that is very realistic.

6 Claims, 14 Drawing Sheets

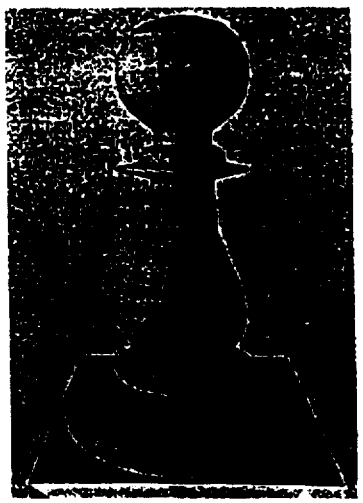  
FIGURE 9A
FIGURE 9B
FIGURE 9C

1

METHOD AND APPARATUS FOR SPECULAR REFLECTION SHADING OF COMPUTER GRAPHIC IMAGES

FIELD OF THE INVENTION

This invention generally relates to improvements in three dimensional graphic display systems and more particularly to a system for improving specular reflection shading.

BACKGROUND OF THE INVENTION

Computers are finding increasing acceptance as tools for rendering depictions of three dimensional (3D) objects. An important aspect of 3D renderings is the ability to shade an object in a manner that conforms to reality. While this goal is easy to state, current state-of-the-art solutions are processor intensive due to the complex math involved in computing the appropriate shading characteristics.

Phong shading is an example of a compute intensive approach to shading. Phong shading is discussed in B. T. Phong's dissertation, *Illumination for Computer-Generated Images*, Ph.D. Dissertation, Department of Computer Science, University of Utah, Salt Lake City, Gov. ordering no. AD-A008 786. Original Phong shading calculations were cost-prohibitive for commercial applications because of the complex math calculations. Many articles were written on various attempts to simplify processing of Phong shading. Some examples are found in Bishop, G., Weimer, David M., *Fast Phong Shading*, ACM Computer Graphics, Vol. 20, No. 4, pp. 103–6 (1986); and Kujik, A. A. M., and Blake, E. H., *Faster Phong Shading via Angular Interpolation*, Computer Graphics Forum, vol. 8, pp. 315–24 (1989). These systems reduced the expense associated with Phong renderings, but still were not economically feasible for realtime rendering hardware. The most expensive part of the rendering calculation is the specular reflection calculation.

SUMMARY OF THE INVENTION

Accordingly, it is a primary objective of the present invention to provide a system for computing a specular reflection shading calculation for 3D renderings of realistic graphic images. The new method uses only a modest number of multiplies and adds to approximate a prior art calculation taught by Phong that required divides, square roots and powers. The invention uses approximate normalization, vector differences, and polynomial shape functions to simplify the processing and improve performance significantly while still generating a graphic rendering that is very realistic.

BRIEF DESCRIPTION OF THE DRAWINGS

FIGS. 9A, 9B and 9C shows images rendered by two less effective shading techniques (flat shading in FIG. 9A and Gouraud shading in FIG. 9B) and by a Phong shading technique (FIG. 9C) in accordance with the subject invention.

DETAILED DESCRIPTION OF THE INVENTION

The invention is preferably practiced in the context of an operating system resident on a personal computer such as an Apple Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12.

Figure 1:
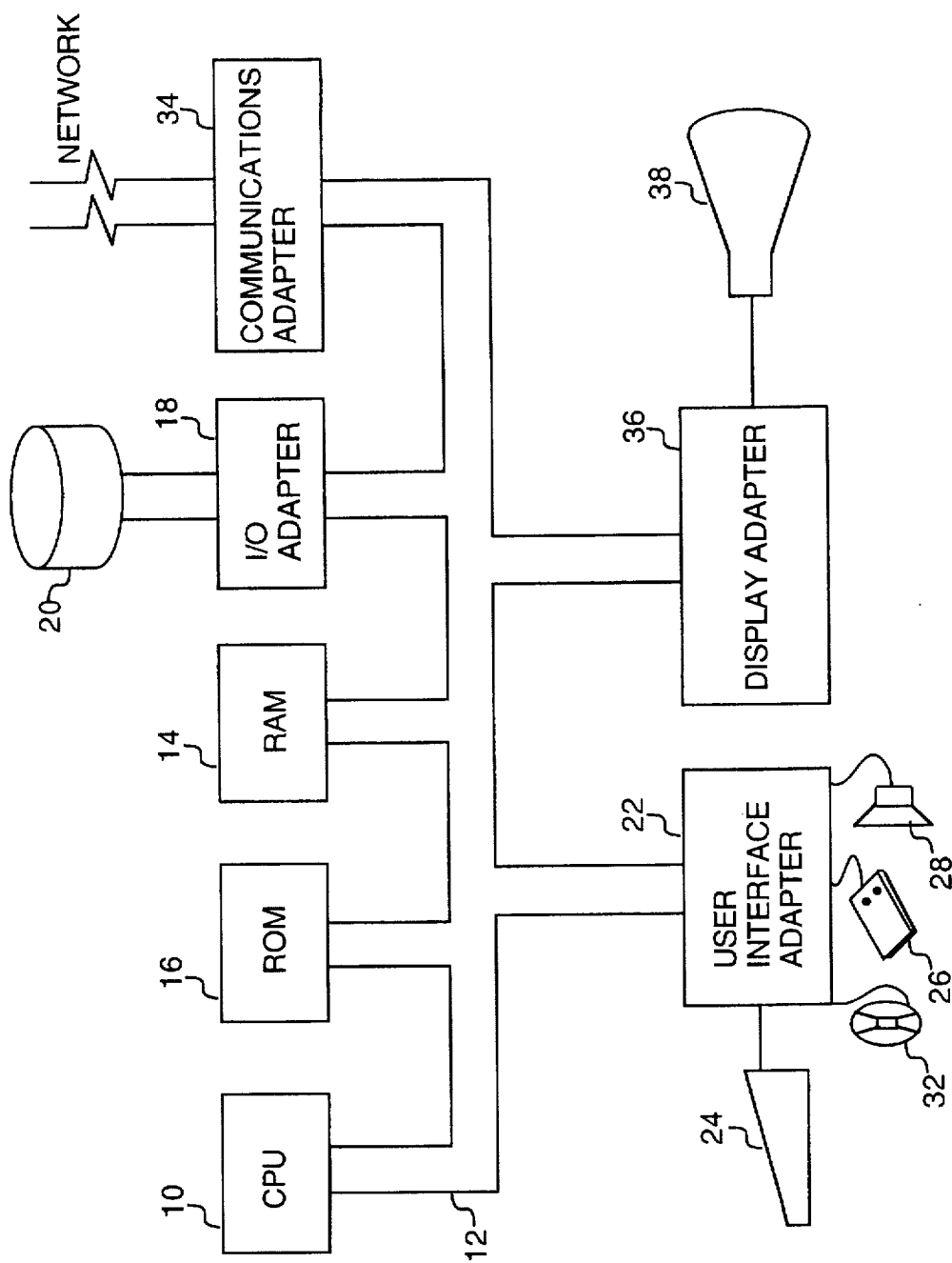
FIG. 1 is a block diagram of a personal computer system in accordance with the subject invention.

The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7 operating system. The subject invention is built into the display adapter 36 to perform renderings of three-dimensional graphic objects. However, one of ordinary skill in the art will readily comprehend that the invention could be implemented as microcode or system software as part of the operating system, and could be used to generate images for storage rather than for immediate display.

Simple reflection models attempt to mimic the interaction of light with a particular surface. The "standard" model in computer graphics is the Phong model. The intensity of a light source seen at a point on a surface, according to the Phong model, is the linear combination of reflected light using a diffuse component and a specular component.

Light incident at a surface is a combination of light reflected, light absorbed, light scattered and light transmitted. The intensity and wavelength of light reflected from a surface depends on incident wavelength, the angle of incidence, the texture of the surface and its electrical properties. Modeling the exact interaction is extremely complex. For example, the texture of a particular surface may be smooth for some wavelengths of light and rough for others. A detailed discussion of the dynamics of reflected light and the Phong model is disclosed in Watt, Alan; *Fundamentals of Three-Dimensional Computer Graphics*, pp. 45–63 (1990).

Figure 2:
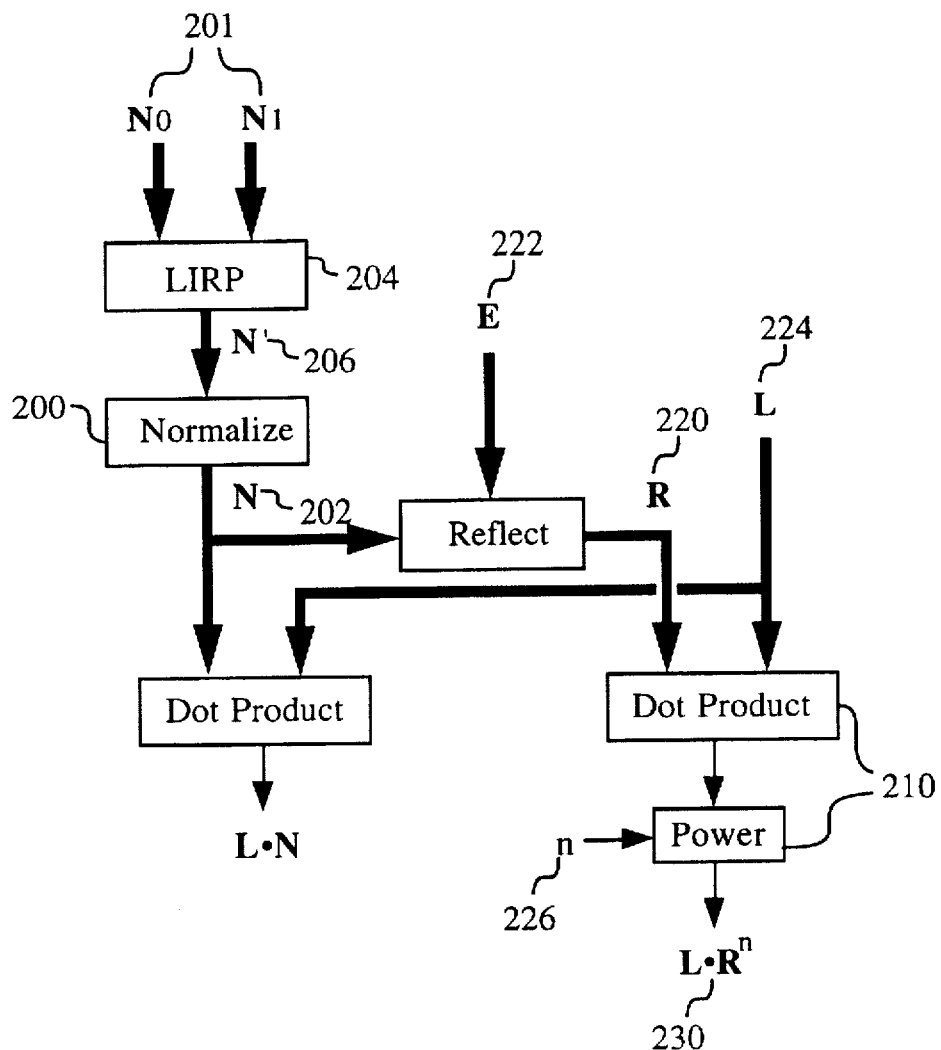
FIG. 2 is a block diagram illustrating a prior art approach to Phong shading.

FIG. 2 illustrates a block diagram of a prior art approach to Phong shading. Standard Phong shading requires a precise normalizing calculation at function block 200 and a processor intensive power operation which amplifies errors in normalization of interpolated vectors at function blocks 210. The configuration of the surface to be rendered, the light, and the eye is described by three direction vectors: N 202 is the surface normal vector (we notate vectors in bold type throughout); L 224 refers to the light vector (a normalized vector pointing from the surface toward the light source); and E 222 to the Eye vector (a normalized vector pointing from the surface toward the eye position). Vector N is "normal", or perpendicular, to the surface; all three of the vectors are "normalized," or of unity length. E and L may be provided as constant vectors for each polygon to be rendered, for an eye position and light source at a great distance, or may be calculated from a linear interpolator (LIRP) for eye and light positions close to the object being rendered. Eye position is sometimes referred to as Viewing position, and the E vector is sometimes referred to as V.

The LIRP block 204 computes a linear interpolation of normal vectors $N_0$ and $N_1$ to produce vector N' 206 that smoothly varies across a surface patch being rendered, as a local approximation to the varying surface normal direction. Since N' is computed linearly as $N'=aN_0+(1-a)N_1$, its length is in general less than unity; i.e., it is not normalized to unity length, even when $N_0$ and $N_1$ 201 are so normalized. Since the operation blocks that follow require an accurately normalized normal vector N, the Normalize operation at block 200 is required.

R 220 is the reflection of the eye vector about the surface normal. The Dot Product and Power calculation at 210 computes the specular amount 230 according to Phong's shading model. The exponent n 226 represents the shininess of the surface material being rendered. In the prior art the power (exponentiation) calculation is cost prohibitive due to the complexity and the accuracy requirements of the calculation.

The subject invention provides a new calculator to replace block 210 and also reduces the accuracy requirement of the normalize block 200. The invention also provides a new approximate normalize calculator to replace block 200.

Figure 3:
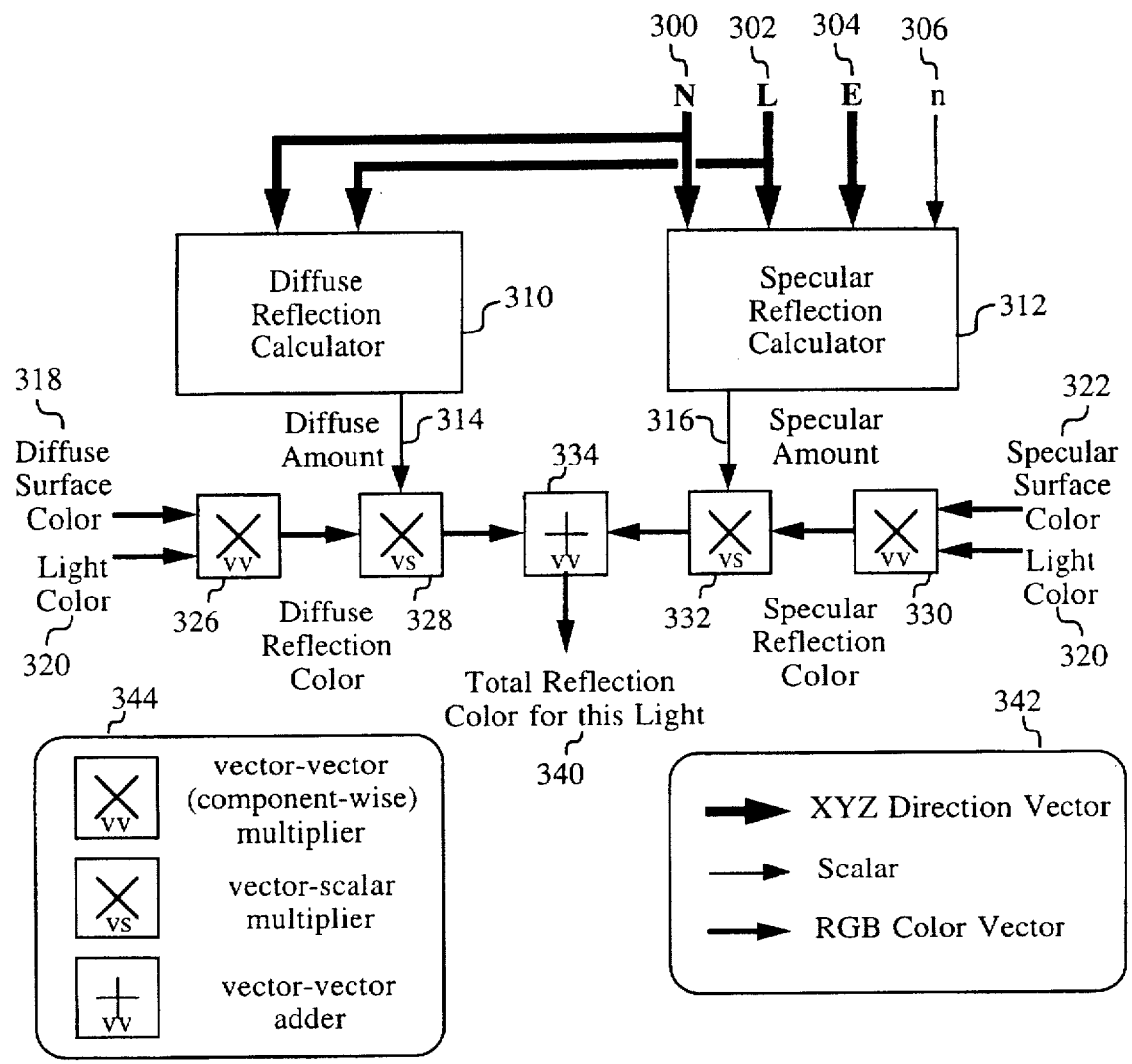
FIG. 3 is a block diagram of a generalized shading calculator in accordance with the subject invention.

FIG. 3 illustrates a block diagram of a generalized shading calculator in accordance with the subject invention. The parameters at the input of the calculator include a normal vector N 300, a light vector L 302, an eye vector E 304, and a shininess coefficient n 306. The legend 342 shows the line styles used to represent direction (XYZ) vectors, N, L and E; scalars such as n; and red, green, blue (RGB) color vectors. The diffuse reflection calculator 310 computes the diffuse amount 314 as the dot product of N and L as in prior art systems. The specular reflection calculator 312 computes the specular amount 316 according to an innovative technique to be detailed later. The diffuse amount 314 and the specular amount 316 are combined with the light color 320, the diffuse surface color 318, and the specular surface color 322 by the vector arithmetic operators 326, 328, 330, 332 and 334 as shown to produce the total reflected color vector 340. Legend 344 shows the vector operator notations used. If there are additional lights beyond a single source, then the calculations are repeated for each of the light sources and summed. Calculated intermediate values that do not depend on the light vector are not necessarily re-calculated for each light source.

In Phong shading, the direction vectors at the input to the calculator of FIG. 3 are interpolated across surface patches (polygons) to be rendered. The light vector L 302 and the eye vector E 304 may be provided as constant if the light source and eye position are at a nearly infinite distance from the object being rendered. The normal vector N 300 is interpolated according to Phong's original teachings. Part of the interpolation process is a normalization to unity length, which requires a vector dot product, a square root, and a divide. Other styles of shading include Gouraud shading and flat shading. In Gouraud shading, the direction vectors at the input to the calculation are provided at the corners of the surface patches and the output color vectors are interpolated across patches at the output. In flat shading, the entire shading calculation is done only once for each surface patch. While the Phong shading method benefits most from the invention, all other rendering methods that include a specular component are also improved by the subject invention.

Figure 4A:
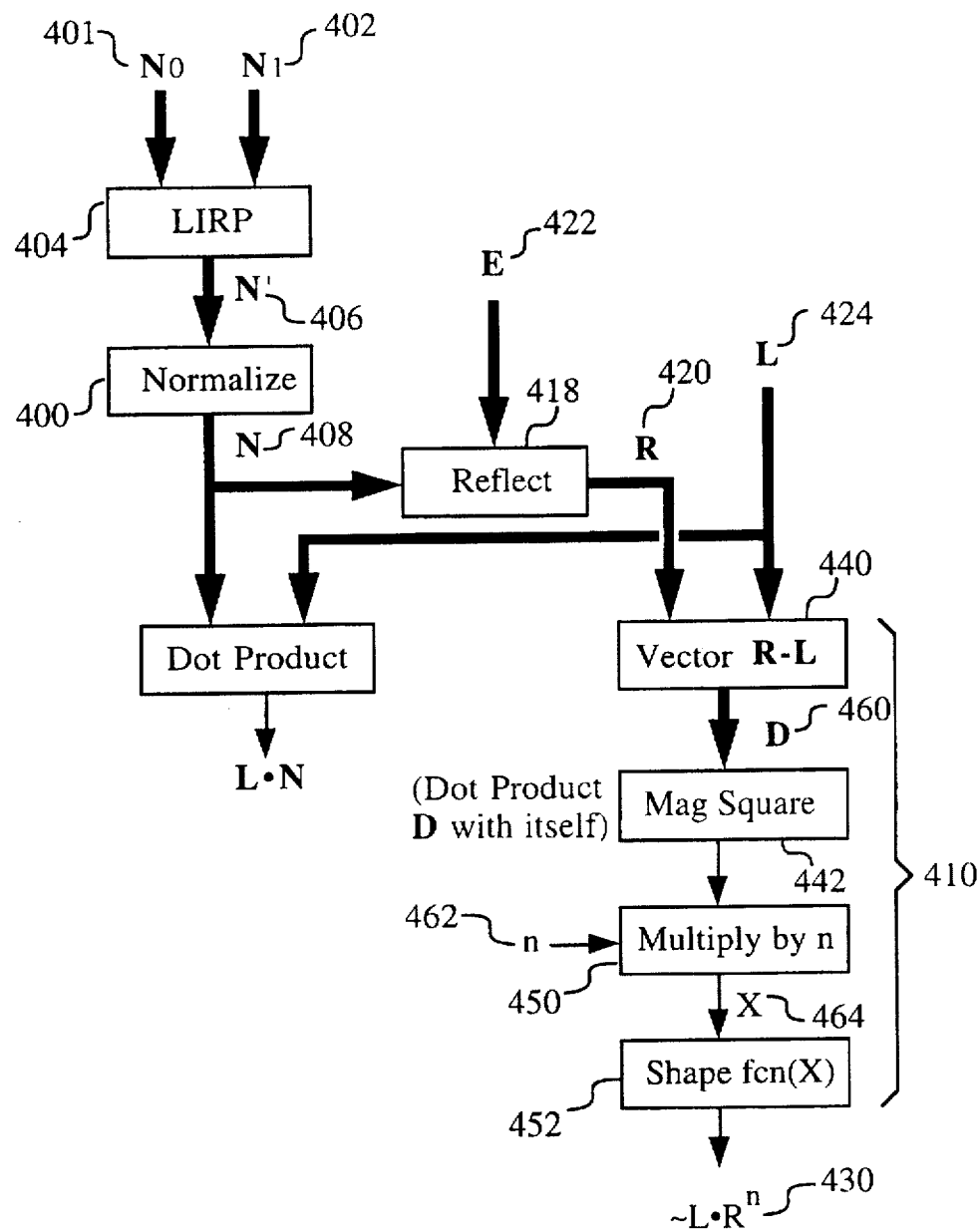
FIG. 4A is a block diagram illustrating an improved Phong shading apparatus in accordance with the subject invention.

FIG. 4A illustrates a block diagram of an improved Phong shading apparatus in accordance with the subject invention. Some of the operations are performed in the same manner as in the prior art approach. The two primary changes are at function block 400 and the functions spanning 410.

Figure 4B:
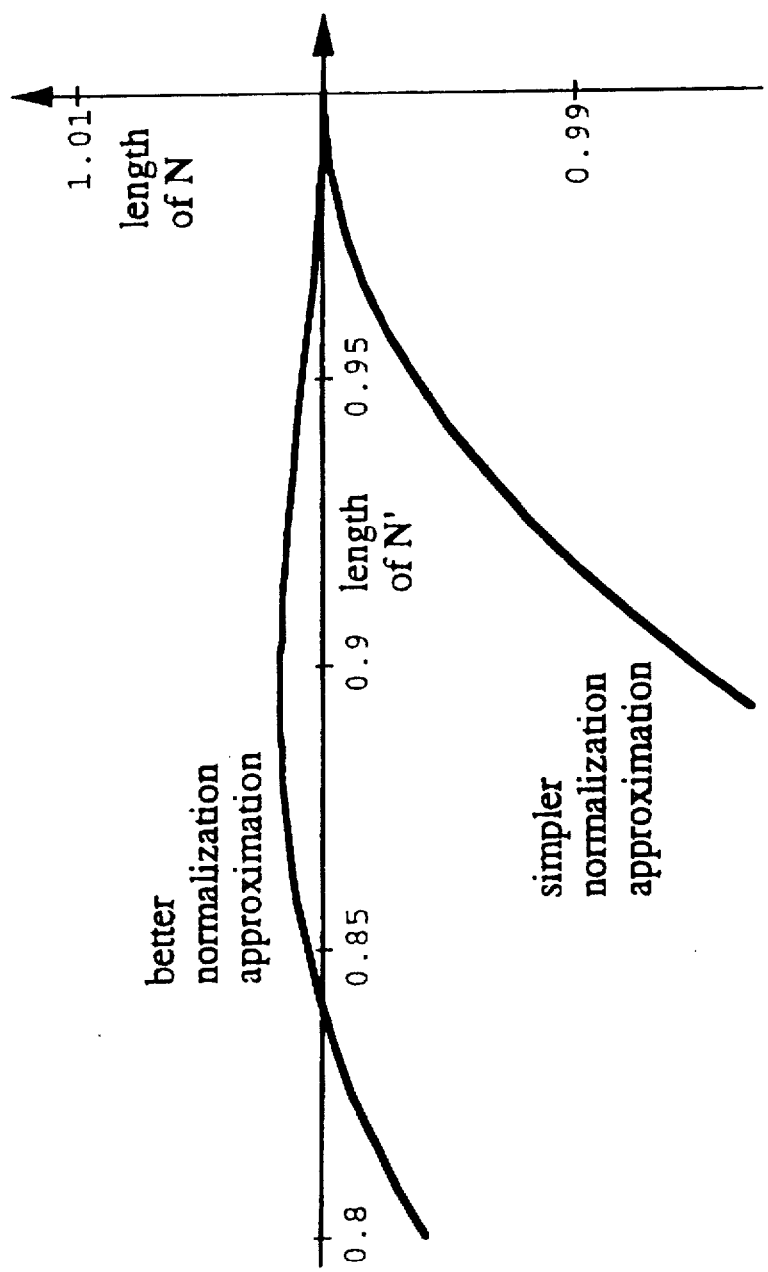
FIG. 4B. is a plot of the length of an approximately normalized vector N in accordance with the subject invention.

The linearly interpolated vector N' 406 has a length that is generally less than unity. Function block 400 performs an approximation of the normalization process by multiplying N' by $1+(1-N'\cdot N')/2$ or by $1+((1-N'\cdot N')+(1-N'\cdot N')^2)/2$ to assure that the resulting normal vector N 408 has a length near enough to unity. FIG. 4B is a plot of the length of an approximately normalized vector N in accordance with the subject invention. The plot illustrates the length of an approximately normalized vector N as a function of the unnormalized vector N' for a pair of normalization factors. The plot shows a range in excess of one percent error for the simpler scheme, and less than one-half of a percent error for the better normalization approximation. The length 0.8 for N' corresponds to an angle between N0 and N1 of seventy-four degrees, and 0.9 corresponds to 52 degrees, which are reasonable constraints on the angles between normal vectors in an operational system.

One of ordinary skill in the art will realize that other approximations to the ideal normalization operation are possible, and that a suitable approximation may be chosen in accordance with the numerical error requirements of the system. In prior art systems, a normalization precision of about one part in four thousand was typically chosen, while in the subject invention a precision of one part in 100 will be generally acceptable.

The Dot Product and Power calculation have been replaced by a less complex vector subtraction of (R-L) at function block 440. The squared magnitude of the resulting difference D 460 is computed at function block 442 by taking the dot product of the vector D with itself. This calculation is performed by Dx*Dx+Dy*Dy+Dz*Dz. Then, in function block 450, a multiplication by shininess n 462 is performed to generate an intermediate scalar X 464. Finally, a shape function is performed on X at block 452 to simulate the shape of specularly reflected light. The shape function yields a robust approximation to the nth power of the cosine of the angle between L and R as notated at 430.

For example, the innovative shape function $(1-X/8)^4$ for X<8, and 0 otherwise, is a good approximation to $\cos(\theta)^n$, where theta is approximately the square root of X/n or |D|. The shape function expressed as a function of theta, for sufficiently large values of n, looks similar to a Gaussian bell curve, which has also been proposed as a specular shading model. However, while the tails of a Gaussian bell curve extend to infinity, and the tails of $\cos(\theta)^n$ extend to theta=Pi/2, this polynomial approximation to the bell curve goes to zero smoothly at X=8 (at theta=sqrt(8/n), which is a small angle when n is large).

Figure 4C:
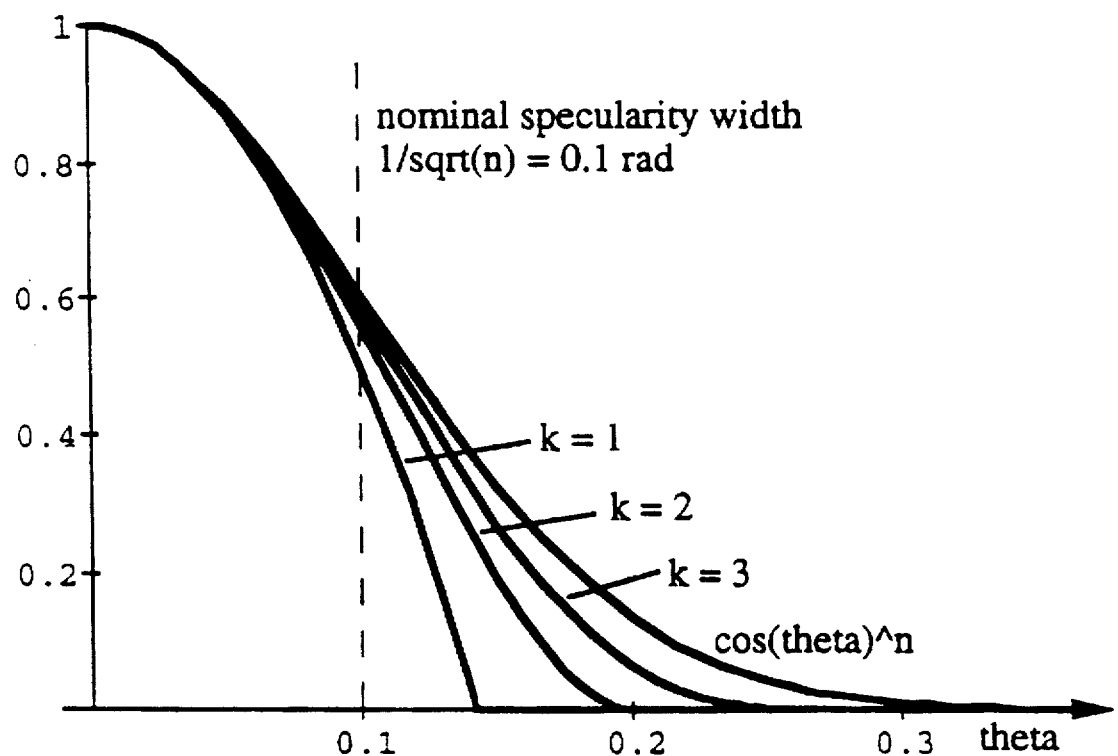
FIG. 4C is a graph comparison of a shape function for three values of k in accordance with the subject invention.

A more general family of polynomial approximations is given by $(1-X/(2^k))^{(2^{(k-1)})}$, where for the example above, k=3. For k=1, the shape of the specular reflection goes abruptly to 0 at X=2. For higher values of k, the tails go more smoothly to zero at $X=2^k$, and the function more closely approximates a Gaussian bell curve. In rendered images, specular reflections are often found to drop to zero too slowly, so a small value of k such as 2 or 3 may provide more aesthetic or more realistic images than Phong shading. FIG. 4C is a graph comparison of a shape function for three values of k in accordance with the subject invention. The graph plots a comparison of a specularity shape function for three values of k to the conventional Phong specularity shape. The plots employ an approximation of theta=|D|, for the case of n=100. The plots show how the width of the specularity relate to the shininess factor "n".

The shading calculation of the subject invention is almost the same quality, but much cheaper to compute, relative to the prior art calculation. The diffuse amount L·N is in error by the same percentage that the approximate normalization is in error, but the specularity error via the shape-function method of the subject invention is much less than the error in $(L \cdot R)^n$.

The Reflect function block 418 implements an operation common in the prior art to generate a direction vector pointing in the direction that the eye vector's gaze would reflect off a mirror surface.

Figure 5:
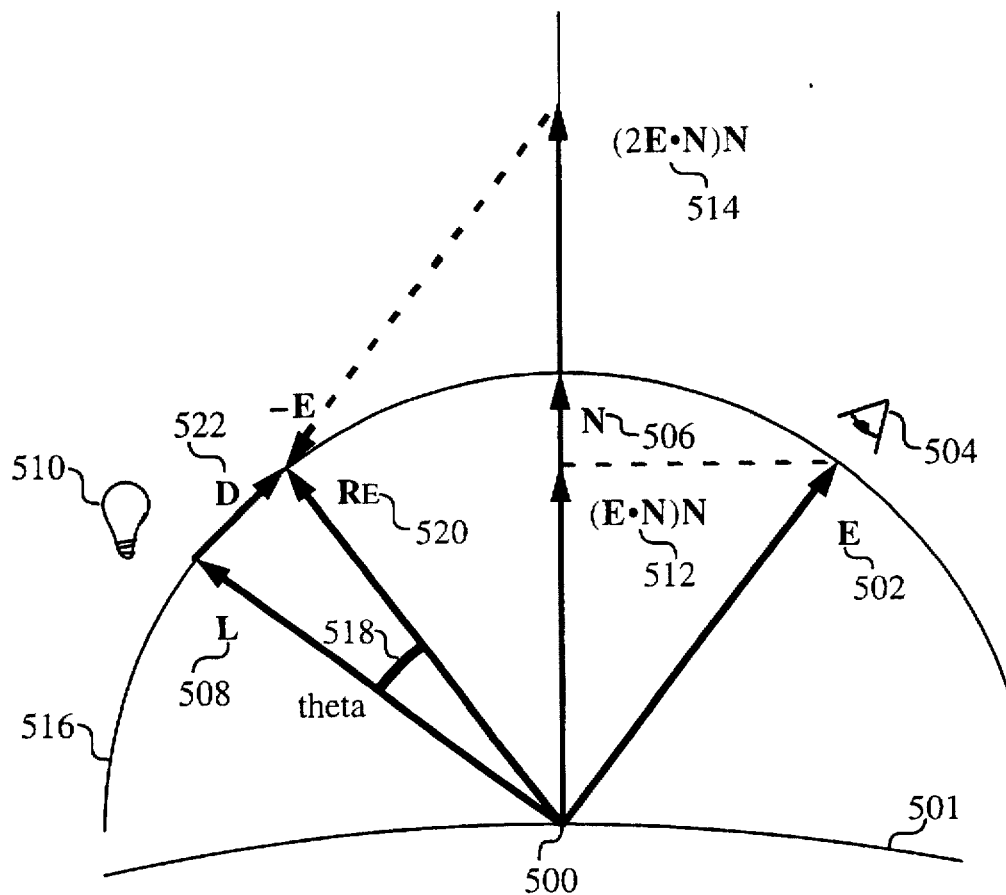
FIG. 5 shows a vector diagram of a preferred method for calculating a difference vector relative to a specular reflection in accordance with the subject invention, using a reflected eye vector.

FIG. 5 illustrates, using a vector diagram, the calculation performed by the Reflect function block 418, and the use of the resulting reflected eye vector $R_E$ 520 to compute a difference vector D 522 in accordance with the subject invention.

A subject point 500 on a 3D surface patch 501 to be rendered is taken as the origin of the direction vectors E 502 pointing toward the eye or viewing position 504, N 506 pointing orthogonally out from the surface, and L 508 pointing toward the light source 510. The projection of the eye vector E 502 onto the surface normal vector N 506 is indicated graphically and algebraically as (E·N)N 512, and twice the vector 512 is indicated as (2E·N)N 514. Subtracting vector E 502 from vector (2E·N)N 514 yields the reflected eye vector (2E·N)N–E, indicated as vector $R_E$ 520. This calculation is well known in the prior art, and is known to produce a vector $R_E$ 520 of length unity if the vectors E 502 and N 506 have length unity (i.e., the vectors are normalized). A unit-radius arc 516 is drawn to illustrate that the vectors E 502, N 506, L 508 and $R_E$ 520 are normalized.

In FIG. 5, all vectors are illustrated as being in the plane of the figure, for clarity, but it will be understood by those of ordinary skill in the art that the operations indicated can be performed on arbitrary vectors in 3D space. The reflected eye vector $R_E$ 520 is illustrated close to the light vector L 508, in which case a specular reflection would be visible. In general, $R_E$ 520 and L 508 may be far apart, in which case no specular reflection would be visible.

If the reflected eye vector $R_E$ 520 coincides with the light vector L 508, then the subject point 500 on the surface reflects a ray of light from the (simulated) light source 510 directly into the (simulated) eye 504, and the specular reflection is maximal. In this case, the specular amount 316 of the generalized shader of FIG. 3 should be computed as unity. If $R_E$ 520 does not coincide with L 508, then the specular amount 316 of the generalized shader of FIG. 3 should be computed as less than unity. For this purpose, prior art techniques evaluate the closeness of $R_E$ 520 and L 508 by taking their dot product (the sum of the products of their respective orthogonal vector components). The dot product $R_E \cdot L$ is equal to the cosine of the angle theta 518 between the vectors, ideally, but is also multiplied by the product of the lengths of the vectors, which are in general not precisely unity due to normalization imprecision.

According to the subject invention, a better way to evaluate the closeness of $R_E$ 520 and L 508 is by using the difference vector D 522 between them. If the vectors $R_E$ 520 and L 508 are not the same length, as is likely due to normalization imprecision, the vector D 522 will not go precisely to zero when the vectors $R_E$ 520 and L 508 point in exactly the same direction. But the calculation of the specular reflection in terms of the squared length of vector D 522, according to the subject invention, is much less sensitive to normalization imprecision than is the prior art technique.

Figure 6:
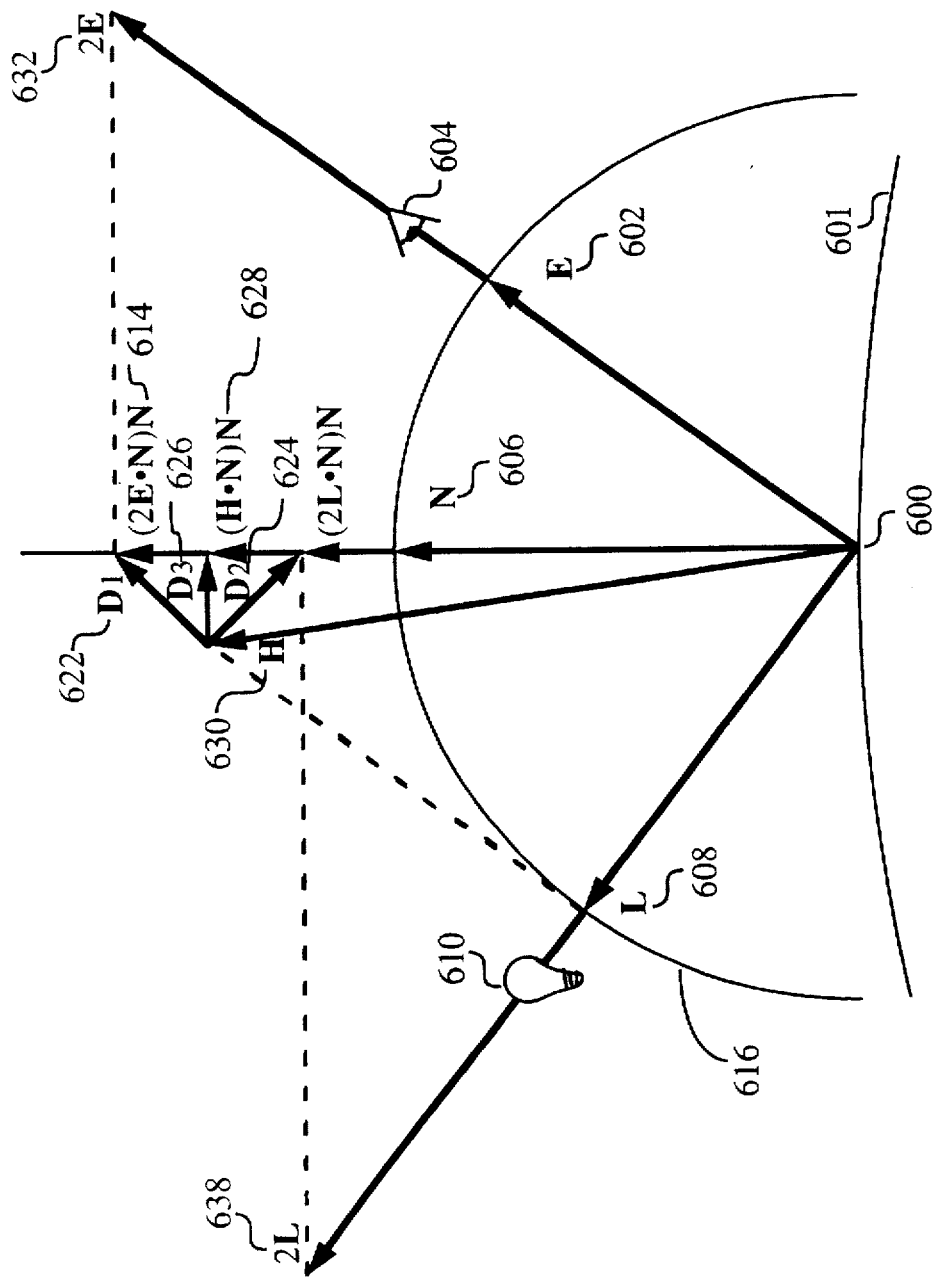
FIG. 6 shows a vector diagram comparing three different methods for calculating a difference vector relative to a specular reflection in accordance with the subject invention, using a half-way vector.

FIG. 6 illustrates, using a vector diagram similar to that of FIG. 5, three alternative ways to compute a difference vector D in accordance with the subject invention, using a half-way vector H 630 defined by H=E+L, rather than by using a reflected vector.

Vectors E 602, N 606, and L 608 originate at point 600 of surface 601, and are illustrated with eye 604, light 610, and unit-radius arc 616, similarly to FIG. 5.

In the method of FIG. 5, vector D 522 was calculated as $D=R_E-L$, or D=(2E·N)N–E–L. As a first method in FIG. 6, we show a vector $D_1$ 622, which is identical to vector D 522, which may be seen by substituting –H for –E–L in the definition of D to obtain difference vector $D_1$ 622 as $D_1$= (2E·N)N –H. But now the difference is expressed relative to the half-way vector H 630.

In FIG. 6 we have found it convenient to illustrate the calculation of (2E·N)N 614 by first doubling vector E 602 to obtain vector 2E 632, and then projecting it onto N 606, rather than by first projecting and then doubling as in FIG. 5; this difference is not relevant except to reduce clutter in the center of the vector diagram.

In the prior art, it is known that instead of comparing the light vector with the reflected eye vector, the same result (in terms of dot product) may be obtained by comparing the eye vector with the reflected light vector. Correspondingly, in the subject invention a difference vector may be generated by subtracting an eye vector from a reflected light vector. This method is not illustrated explicitly, but produces the identical vector as the second approach illustrated in FIG. 6, which computes $D_2$ 624 as $D_2$=(2L·N)N–H, using the halfway vector H 630 and the projection of the doubled light vector 2L 638 onto N 606.

Vector $D_2$ 624 is not equal to vector $D_1$ 622, but their lengths are equal, so they may be used interchangeably. A third method of computing a difference vector $D_3$ 626 that is not equivalent is motivated by the observation that 2E and 2L appear in equivalent places in the definitions of equivalent vectors, so perhaps E+L would work as well or better. This reasoning leads to the computation of vector $D_3$ 626 as $D_3$=(H·N)N–H, the difference between the half-way vector H 630 and its projection (H·N)N 628 onto N 606.

In a prior art technique taught by Blinn, the normalized half-way vector H* is used, and its dot product with N is used as the basis of the specular reflection computation. The method based on $D_3$ 626 may be viewed as a further improvement of Blinn's method according to the subject invention, since the method of the subject invention entirely avoids the need for a normalization of the half-way vector. The half-way vector is in general difficult to normalize accurately, since the length of E+L may be near zero, even at a maximal specularity. If it is desirable to better approximate Blinn's method, it is possible within the scope of the subject invention to normalize or approximately normalize H 630 to obtain H*, and to then compute D as a difference either between H* and N or between H* and its projection (H*·N)N. These additional methods are not illustrated. A person of skill in the art will realize that there may be a variety of other ways to compute a difference vector whose length is useful as an indicator of the extent to which the configuration being rendered deviates from the maximal specular reflection.

FIG. 7 (parts a–d) illustrates a detailed diagram of a preferred embodiment of the specular shading calculator in terms of elementary arithmetic operations in accordance with the subject invention, using the method of FIG. 5 and the structure of FIG. 4A. FIG. 7a shows the calculation of the interpolated and approximately normalized normal vector N. FIG. 7b shows the Reflect operation that calculates the reflected eye vector $R_E$ from N and E. FIG. 7c shows the calculation of the difference vector D, its squared magnitude, and the intermediate scalar value X. FIG. 7d shows the calculation of the final specular amount as a shape function of X. The calculation of diffuse amount is not shown, since it proceeds as in the prior art.

Figure 7A:
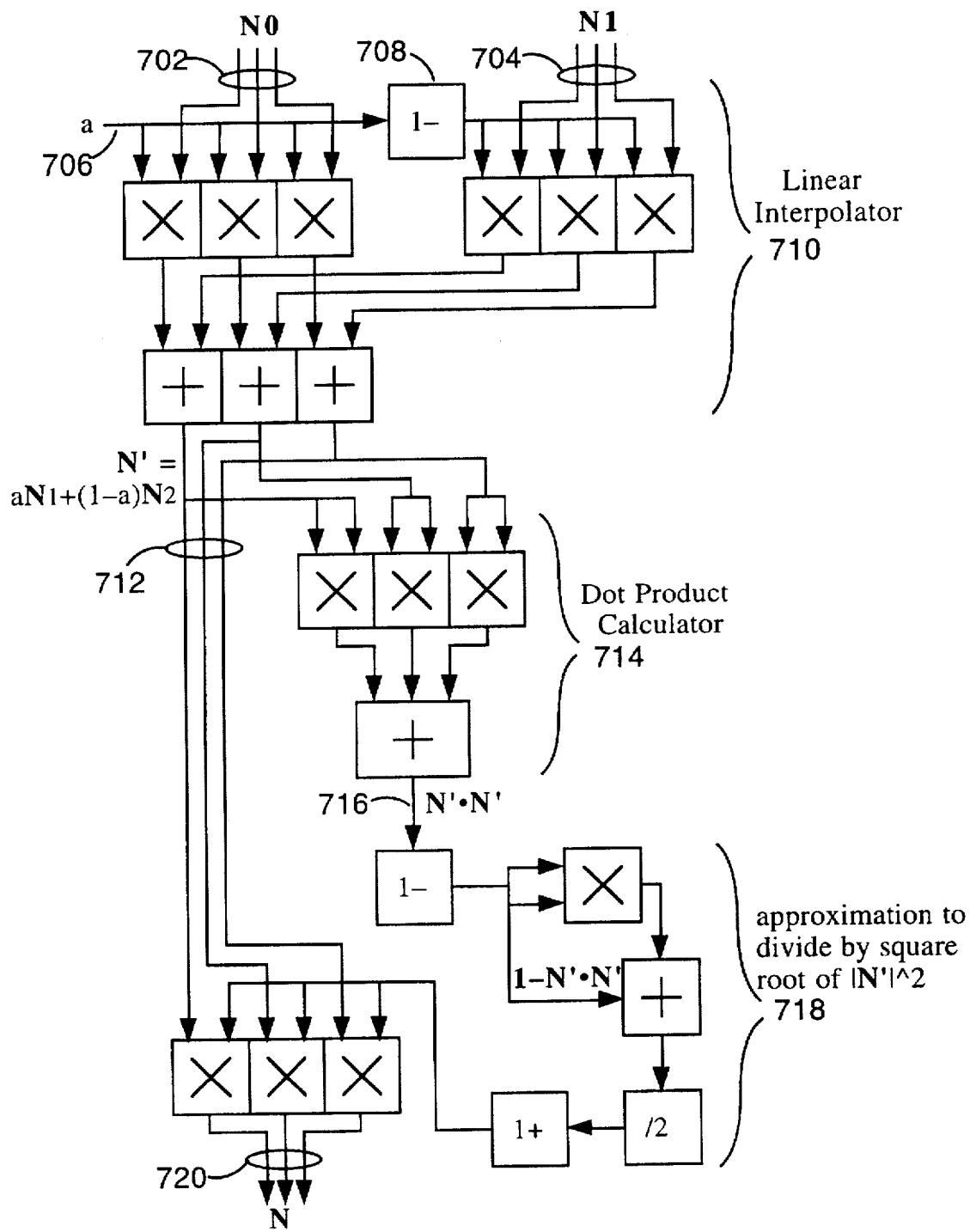
FIGS. 7a–7d illustrate a detailed diagram of the specular shading calculator in terms of elementary arithmetic operations in accordance with the subject invention.

Referring to FIG. 7a, surface normal vectors $N_0$ 702 and $N_1$ 704 representing two corners or edges of a surface patch to be rendered are provided as input to linear interpolator 710, which produces the linear combination N' 712 as determined by the interpolation factor "a" 706, which is applied as a weighting factor on $N_0$. The "1–" block 708 subtracts its input from unity to produce "1–a" as a weight for $N_1$. Further uses of blocks labeled "1–" and "1+" will be understood similarly. An approximate normalization operation on N' follows. Operators 714 compute a dot product which represents the squared length of N' 716, and operators 718 multiply N' by an approximation 1+((1−N'·N')+(1−N'·N')^2)/2 of the reciprocal of the length of N', as discussed above in relation to FIG. 4, to produce a normalized normal vector N 720.

Figure 7B:
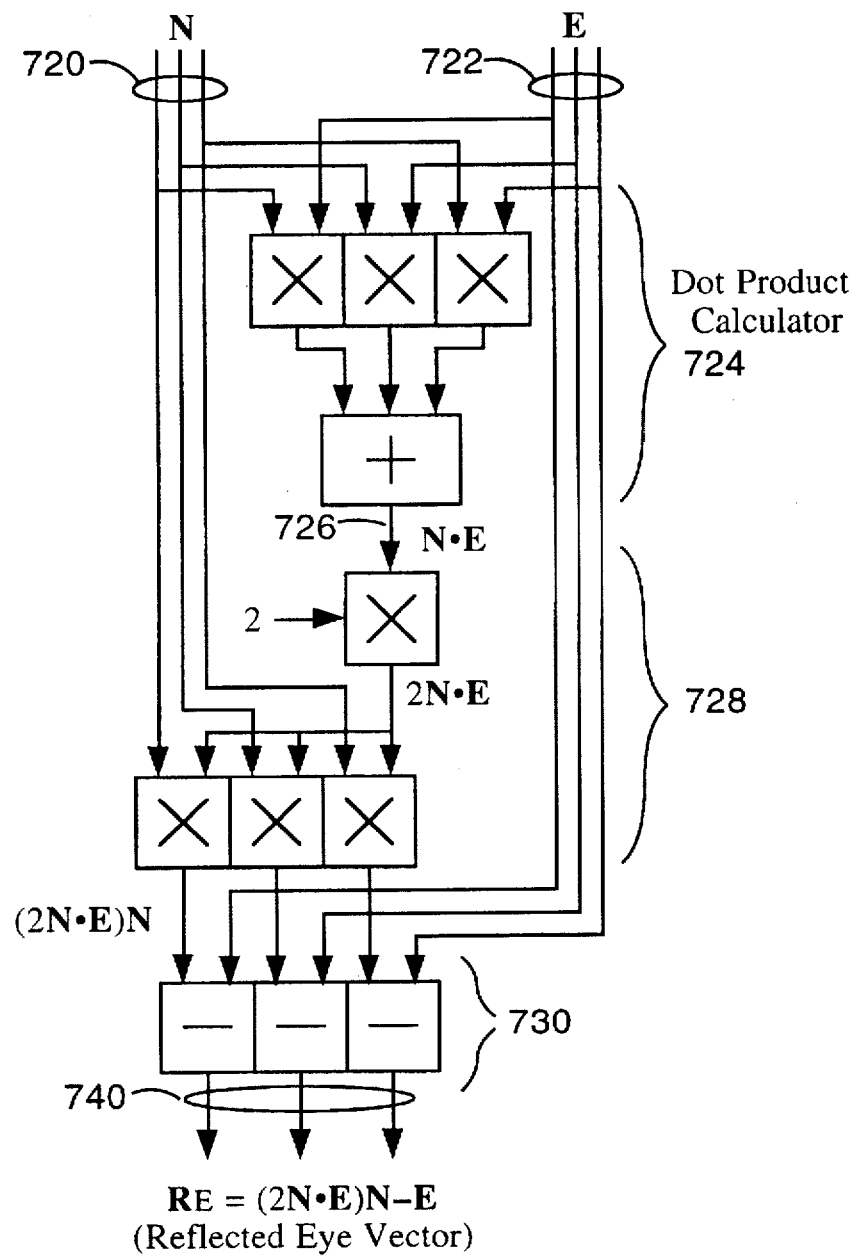

Referring to FIG. 7b representing the Reflect operation, normal vector N 720 and eye vector E 722 are combined by dot product operators 724 to produce N·E 726. Operators 728 compute (2N·E)N, and finally subtractors 730 compute the reflected eye vector $R_E$ 740.

Figure 7C:
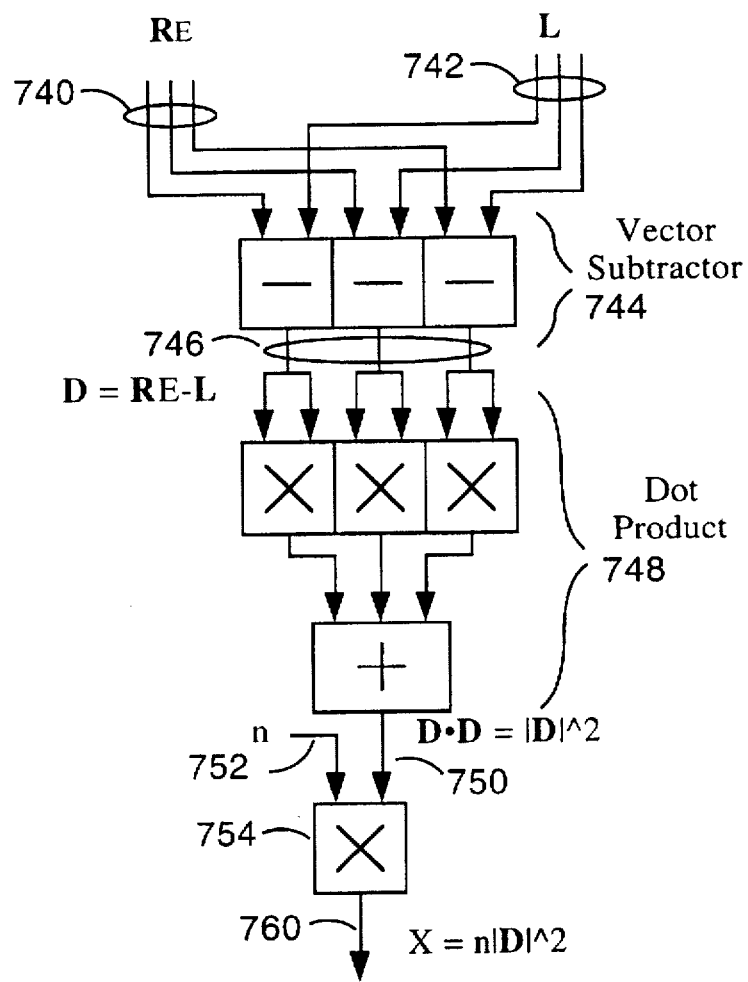

Referring to FIG. 7c, subtractors 744 compute difference vector D 746 as the difference $R_E$−L. Operators 748 compute the dot product of D with itself, D·D 750, which is the squared length of D. Multiplier 754 multiplies a shininess parameter n 752 by D·D 750 to produce an intermediate value X 760.

Figure 7D:
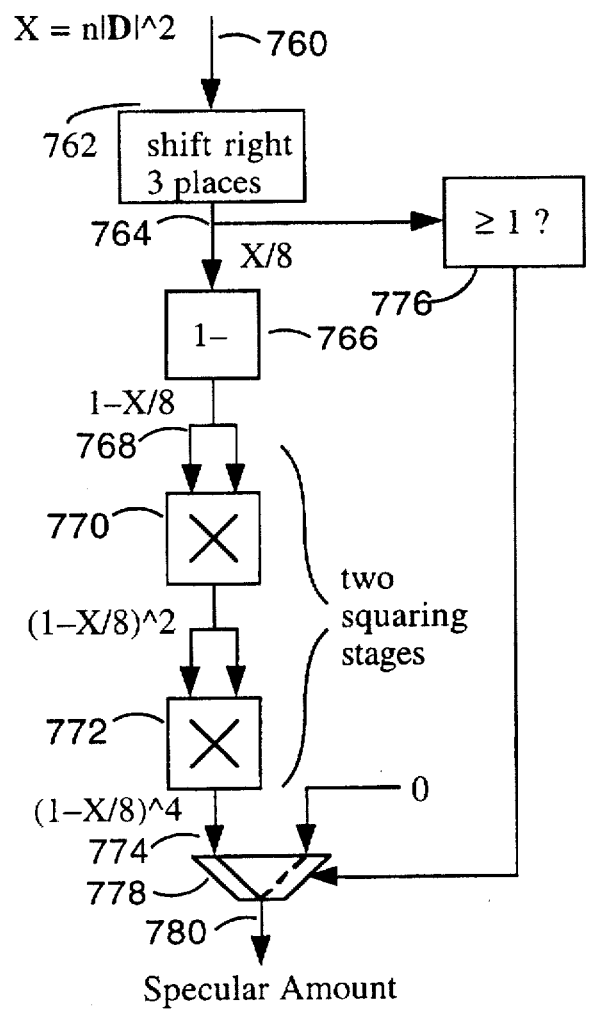

Referring to FIG. 7d, shifter 762 shifts the intermediate value X 760 arithmetically to the right by 3 places, producing X/8 at 764. The "1−" block 766 computes 1−X/8 at 768. Multipliers 770 and 772 are connected as successive squaring circuits to compute the fourth power (1−X/8)^4 at 774. Comparator 776 compares X/8 to unity and controls multiplexor 778 to select either (1−X/8)^4 if X/8 is less than unity, or zero otherwise, to produce the output specular amount 780.

One skilled in the art will realize that the embodiment described in FIG. 7 is based on a choice of shape function characterized by k=3, and that a shape function characterized by a different value of k can be embodied by changing shifter 762 to shift by k places and changing the number of successive squaring multipliers to be k−1, with no further changes.

Figure 8:
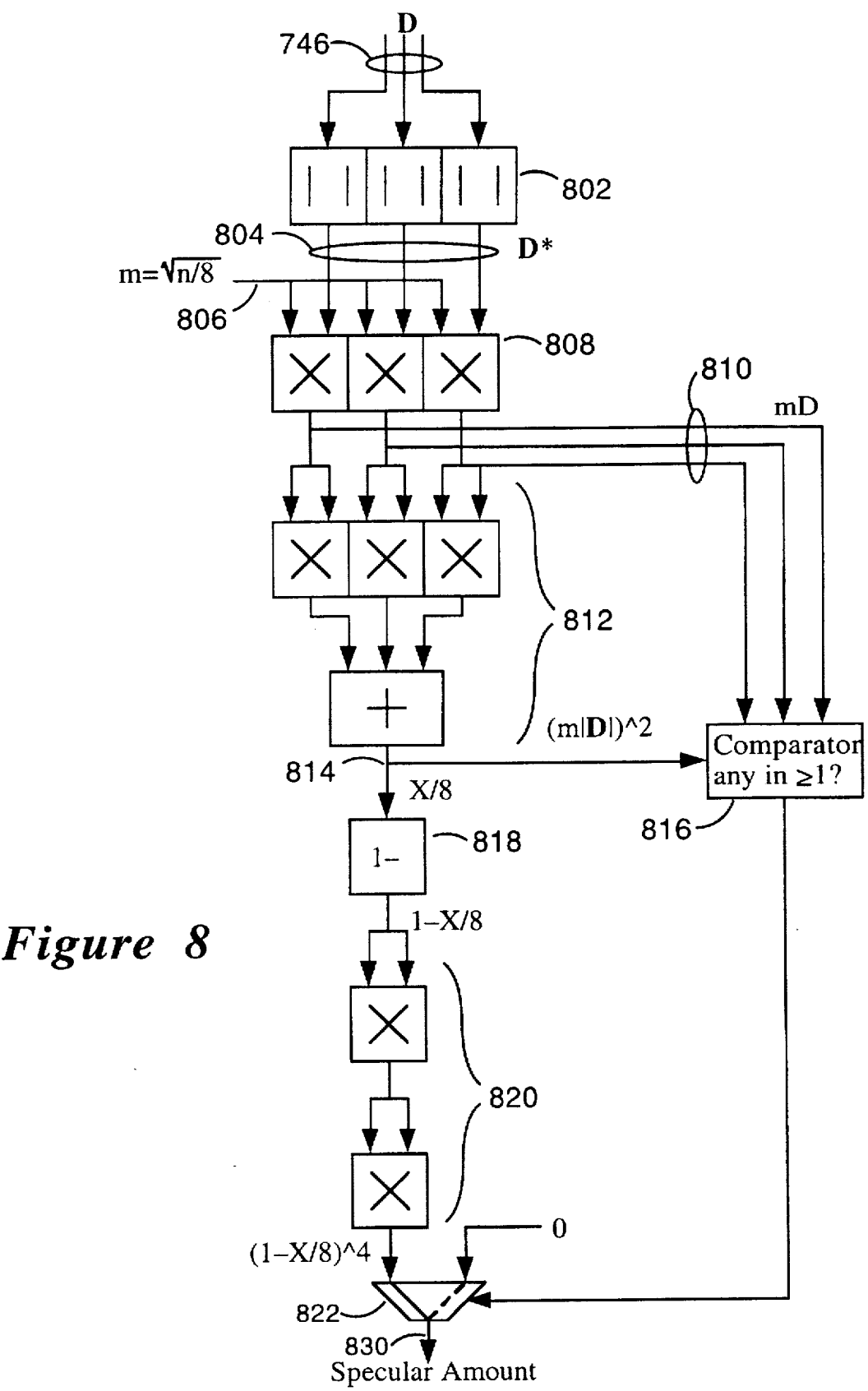
FIG. 8 illustrates a detailed diagram of an alternative embodiment of a portion of a specular shading calculator following the computation of the difference vector, in accordance with the subject invention.

FIG. 8 illustrates a detailed diagram of an alternative embodiment of a portion of a specular shading calculator following the computation of the difference vector D 746. This alternative embodiment represents the surface shininess by a parameter m 806, related to the previously discussed parameter n by the definition m=sqrt(n/8). This definition is motivated by the desire to premultiply the vector D by a parameter of few bits, rather than multiply D·D by a parameter with more bits; the shifter is also eliminated by this modified definition of the shininess parameter. The computation proceeds as follows: difference vector D 746 is rectified by absolute value operators 802 for reasons that will become apparent shortly; multipliers 808 multiply the rectified vector D* 804 by the parameter m 806 to produce vector mD* at 810; dot product operator 812 computes (m|D|)^2 at 814, corresponding to X/8 at 764 in FIG. 7d. The remainder of the calculation proceeds through "1−" block 818, successive squaring blocks 820, and multiplexor 822 as in FIG. 7d, except that comparator 816 is augmented with more inputs to be compared to unity, and selects zero as specular amount 830 ff any input is greater than or equal to unity.

As described above, the embodiment of FIG. 8 will produce exactly the same result as the embodiment of FIGS. 7a–7d, with the absolute value operators 802 and the augmentations to comparator 816 having no effect. The embodiment of FIG. 8 is apparently more costly than that of FIGS. 7a–7d, since it uses two more multipliers to multiply three vector components by m than to multiply a scalar by n. But the embodiment of FIG. 8 may be preferred in a hardware implementation because much smaller multipliers can be used due to numerical advantages of this rearrangement. In particular, the dot product operator 812 needs to accept as input only the bits representing the fractional parts of the vector components, if the components are positive as assured by the absolute value operators 802, and if the integer parts are detected by the augmented comparator 816. Many multiplier bits are saved; for example, multipliers 808 might multiply an 8-bit parameter m 806 with 5 integer bits and 3 fraction bits by 8-bit unsigned fractional magnitudes from vector D* 804; the 5 integer bits of the product are sent only to comparator 816, while perhaps the high-order 8 of the 11 fraction bits are sent only to dot product operator 812. The six 8×8 multipliers at 808 and 812 are likely to be smaller and faster than the three 9×9 multipliers at 746 and one 13×20 multiplier at 752 required for the same accuracy in the embodiment of FIGS. 7a–7d. One skilled in the art will realize that there are several independent differences between the embodiments described, and that many other variations are possible and may be preferred in certain system contexts.

Three examples are shown of the results achieved using two less effective shading techniques (flat shading in FIG. 9A and Gouraud shading in FIG. 9B) and a Phong graphic rendering (FIG. 9C) employing the techniques disclosed in the subject invention. The Phong shading renders the chess pawn shown in FIG. 9C much more realistically than the other two graphic renderings.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A computer system for shading specular reflections in a displayed graphic image rendering of a surface of a three-dimensional object, comprising:

a stored digital data signal R having a value corresponding to a reflection vector of an eye vector from the surface;

a stored digital data signal L having a value corresponding to a light vector directed from the surface toward a light source;

a subtractor for subtracting the digital data signal L from the digital data signal R to generate a difference signal D having a value corresponding to a difference vector formed between the reflection vector and the light vector;

a magnitude unit, coupled to the subtractor, for receiving the difference signal D and generating a magnitude signal having a value corresponding to the magnitude of the difference vector;

a function generator, coupled to the magnitude unit, for receiving the magnitude signal and generating a specular reflection signal, based on the magnitude signal, for shading the displayed graphic image of the three-dimensional object;

a stored digital data signal N', having a value corresponding to a local approximation vector identifying a normal vector to the surface;

a stored digital data signal E, having a value corresponding to a normalized eye vector directed from the surface toward the position of an eye observing the surface;

a reflection calculator coupled to the subtractor for receiving and combining the N' signal and the E signal to generate the R signal used by the subtractor; and a vector normalizer for producing a digital data signal N according to the formula:

$$N = N'*2$$

and wherein signal N' normalized as signal N is used by the reflection calculator to generate the R signal.

2. The computer system of claim 1, wherein output signal D is calculated according to the formula:

$$D = ((2E \cdot N)*N) - E - L.$$

3. A method of using a light vector L, an Eye vector E, a Normal vector N', and a shininess parameter n to produce a specular reflection value, comprising the steps of:

normalizing said Normal vector N' through the steps of multiplying N' by N' to form the dot product N'·N'; subtracting N'·N' from 1 to form the difference 1−N'·N'; squaring 1−N'·N' to form the square $(1-N' \cdot N')^2$; adding 1−N'·N' to $(1-N' \cdot N')^2$ to form the sum $$(1 - N' \cdot N' + (1 - N' \cdot N')^2);$$

dividing $(1-N' \cdot N' + (1-N' \cdot N')^2)$ by 2 to form the quotient $$(1 - N' \cdot N' + (1 - N' \cdot N')^2)/2;$$

adding $(1-N' \cdot N' + (1-N' \cdot N')^2)/2$ to 1 to form the sum $$1 + ((1 - N' \cdot N' + (1 - N' \cdot N')^2)/2);$$

and multiplying N' by $1 + ((1 - N' \cdot N' + (1 - N' \cdot N')^2)/2)$ to form the normalized Normal vector N;

using said normalized Normal vector N and a selected one of said Eye vector E and of said Light vector L to produce a Reflection vector R which equals the reflection of the selected vector about the normalized Normal vector N;

subtracting said Reflection vector R from the non-selected one of said Eye vector E and of said Light vector L to produce a Difference vector D;

calculating the dot product of said Difference vector D with itself to produce a squared-magnitude $|D|^2$;

evaluating a shaping function $f(|D|^2, n)$ to produce said specular reflection value; and using said specular reflection value in generating a pixel signal.

4. A method of using a light vector L, an Eye vector E, a Normal vector N', and a shininess parameter n to produce a specular reflection value, comprising the steps of:

using said Normal vector N' and a selected one of said Eye vector E and of said Light vector L to produce a Reflection vector R which equals the reflection of the selected vector about the Normal vector N';

subtracting said Reflection vector R from the non-selected one of said Eye vector E and of said Light vector L to produce a Difference vector D;

calculating the dot product of said Difference vector D with itself to produce a squared-magnitude $|D|^2$;

evaluating a shaping function $f(|D|^2, n)$ to produce said specular reflection value, wherein said shaping function is:

$$f = (1 - (|D|^2 * n)/(2^{\hat{}}k))^{\hat{}}(2^{\hat{}}(k-1))$$

where k is an integer; and using said specular reflection value in generating a pixel signal.

5. Specular reflection image calculating means for using a light vector L, an Eye vector E, a Normal vector N', and a shininess parameter n to produce a specular reflection value, comprising:

means for using said Normal vector N' and a selected one of said Eye vector E and of said Light vector L to produce a Reflection vector R which equals the reflection of the selected vector about the Normal vector N';

means for subtracting said Reflection vector R from the non-selected one of said Eye vector E and of said Light vector L to produce a Difference vector D;

means for calculating the dot product of said Difference vector D with itself to produce a squared-magnitude $|D|^2$;

means for evaluating a shaping function $f(|D|^2, n)$ to produce said specular reflection value; and means for using said specular reflection value in generating a pixel signal.

6. The specular reflection image calculating means recited in claim 5 wherein the means for using said Normal vector N', for normalizing said Normal vector N', comprises:

means for multiplying N' by N' to form the dot product N'·N';

means for subtracting the dot product from 1 to form a dividend;

means for dividing the dividend by 2 to form a quotient;

means for adding the quotient to 1 to form a sum; and means for multiplying the sum by N' to form the nomaalized Normal vector N.

* * * * *

UNITED STATES PATENT AND TRADEMARK OFFICE
CERTIFICATE OF CORRECTION

PATENT NO : 5,739,820
DATED : April 14, 1998
INVENTOR(S) : Lyon, Richard F.

It is certified that error appears in the above-identified patent and that said Letters Patent is hereby corrected as shown below:

In the Claims:

In Claim 1, at column 9, line 37, delete "N=N'*2"

and insert -- $N = N' * [1 + \frac{(1 - N' \cdot N') + (1 - N' \cdot N')^2)}{2}]$ --.

In Claim 6, column 10, line 64, delete "nomaal-" and insert -- normal- --.

Signed and Sealed this

Fifth Day of October, 1999

Attest:

Q. TODD DICKINSON

*Attesting Officer*    *Acting Commissioner of Patents and Trademarks*